W. A. NIELSON.
CUSPIDOR COLLECTOR AND CARRIER.
APPLICATION FILED OCT. 10, 1912.
1,068,920.
Patented July 29, 1913.
2 SHEETS—SHEET 1.
Fig. 1
Fig. 2
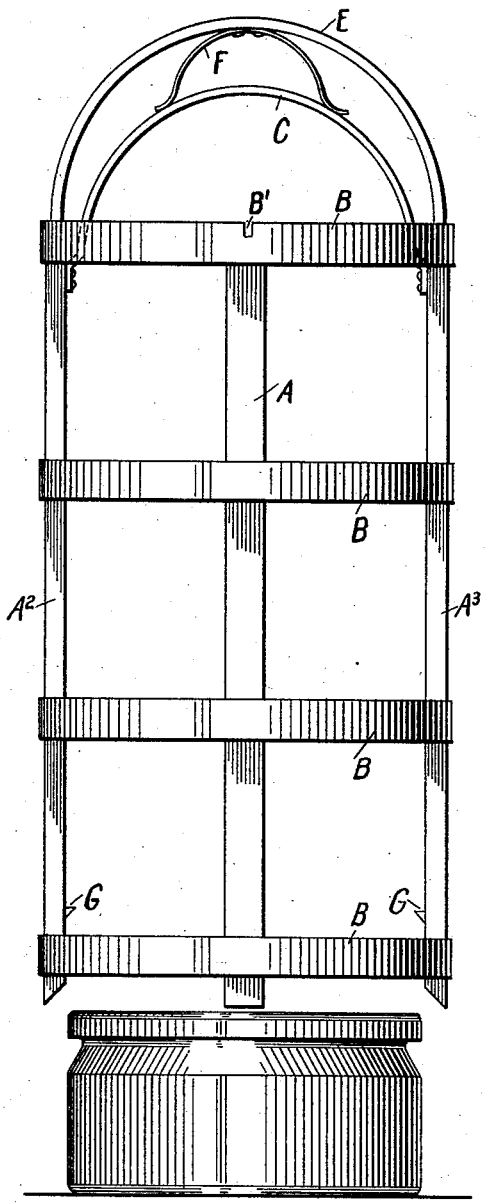
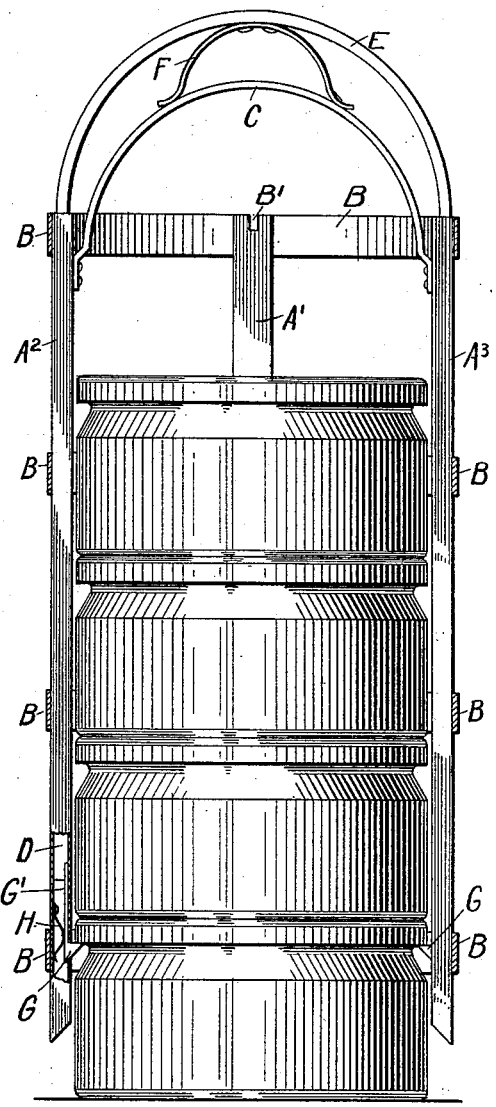
WITNESSES
INVENTOR
Walter A. Nielson,
BY
ATTORNEYS W. A. NIELSON.
CUSPIDOR COLLECTOR AND CARRIER.
APPLICATION FILED OCT. 10, 1912.
1,068,920.
Patented July 29, 1913.
2 SHEETS—SHEET 2.
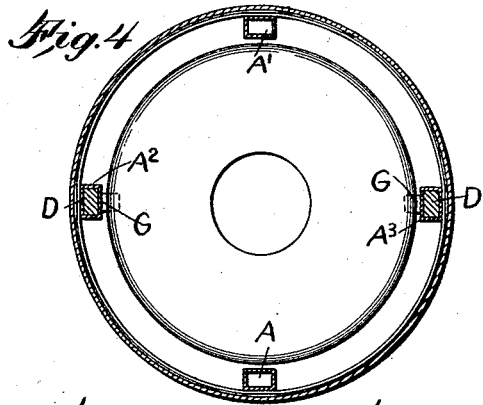
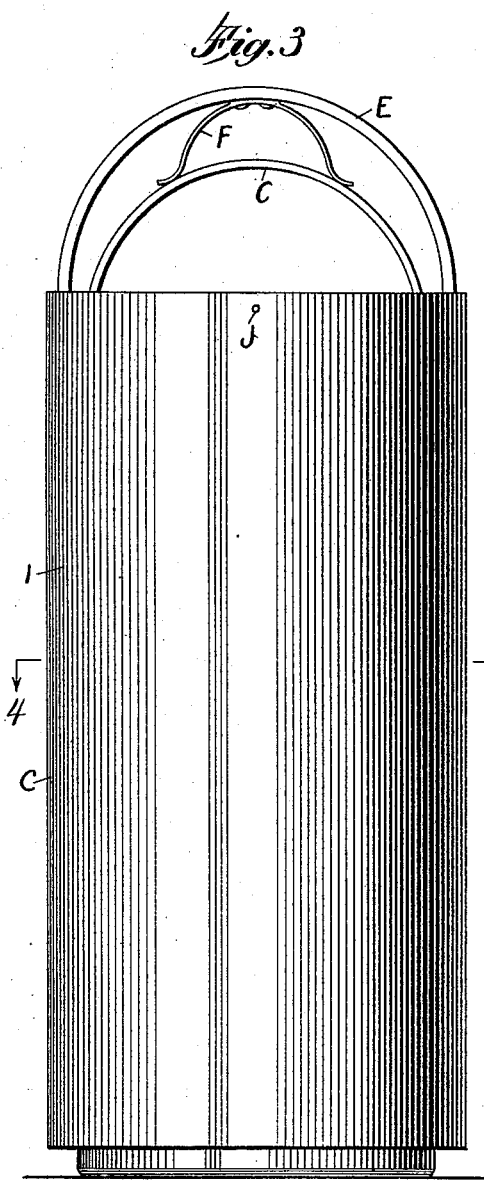
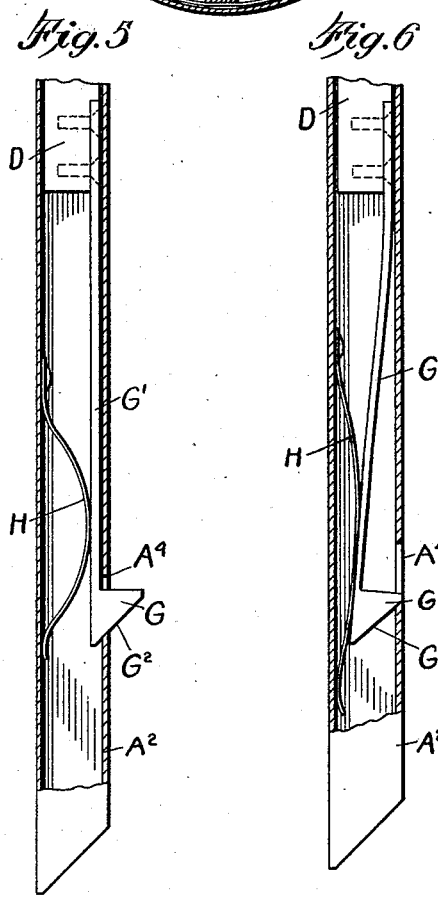
WITNESSES
INVENTOR
Walter A. Nielson,
BY
ATTORNEYS

UNITED STATES PATENT OFFICE.

WALTER A. NIELSON, OF NEW YORK, N. Y.

CUSPIDOR COLLECTOR AND CARRIER.

1,068,920.  Specification of Letters Patent.  Patented July 29, 1913.

Application filed October 10, 1912. Serial No. 724,954.

*To all whom it may concern:*

Be it known that I, WALTER A. NIELSON, a citizen of the United States, and a resident of the city of New York, borough of Manhattan, in the county and State of New York, have invented a new and Improved Cuspidor Collector and Carrier, of which the following is a full, clear, and exact description.

The object of the invention is to provide a new and improved cuspidor collector and carrier for use in office buildings, hotels and other places, and arranged to permit of readily collecting a number of cuspidors and safely carrying the same to a distant place for washing or other purposes.

For the purpose mentioned, use is made of a frame open at the bottom and provided at the top with a handle, the frame having vertical guideways provided at their inner faces with openings, spring-gripping members having gripping heads adapted to project through the said openings to grip the necks of the cuspidors, the said gripping heads having inclined bottoms in engagement with the bottoms of the said openings, bars slidable in the said guideways and carrying the said gripping members, and a handle attached to the upper ends of the said bars and spaced from said frame handle.

A practical embodiment of the invention is represented in the accompanying drawing, forming a part of this specification, in which similar characters of reference indicate corresponding parts in all the views.

Figure 1 is a side elevation of the cuspidor collector and carrier arranged above a cuspidor; Fig. 2 is a sectional side elevation of the same, one of the guide bars being shown in section and a number of superimposed cuspidors being shown collected in the frame; Fig. 3 is a side elevation of the cuspidor collector and carrier and showing the frame inclosed in a shell; Fig. 4 is a sectional plan view of the same on the line 4—4 of Fig. 3; Fig. 5 is an enlarged sectional side elevation of one of the cuspidors and gripping devices with the gripping heads in projected active position; and Fig. 6 is a similar view of the same with the gripping head in withdrawn or released position.

The frame for receiving and holding the cuspidor is preferably formed of a series of vertically-disposed bars $A$, $A'$, $A^2$ and $A^3$ encircled by a series of bands $B$ so as to form a frame which is open at the bottom for the entrance of the cuspidors, as hereinafter more fully explained. The bars $A^2$ and $A^3$ are provided at their upper ends with a handle $C$, and the said bars are preferably made hollow to form guideways for bars $D$, $D$ to slide in, the upper ends of the said bars $D$ being connected with each other by a handle $E$ extending a short distance above the frame handle $C$, as plainly shown in the drawings. A spring $F$ is interposed between the handles $C$ and $E$, and this spring is preferably attached to the under side of the handle $E$ at the middle thereof. The lower ends of the bars $D$ are provided with gripping devices each having a head $G$ held on the lower end of a resilient shank $G'$ secured at its upper end to the corresponding bar $D$, as plainly indicated in Figs. 5 and 6. Each gripping head $G$ projects normally through an opening $A^4$ on the inner side of the bars $A^2$ and $A^3$, and the under side $G^2$ of the gripping head $G$ is beveled and engages the bottom of the opening $A^4$. A spring $H$ attached to the corresponding bar $A^2$ or $A^3$ bears against the corresponding shank $G'$ so as to normally hold the head $G$ in projected position so that the head is in the path of a cuspidor and is adapted to engage the neck thereof when pushing the frame downward over a cuspidor, as will be readily understood by reference to Figs. 1 and 2. It is understood that normally the handle $E$ and with it the bars $D$ are held in uppermost position by the action of the spring $F$, so that the gripping heads $G$ are normally in inward position, that is, in the path of a cuspidor entering the open bottom of the frame.

When using the device the operator takes hold of the handle $E$ and places the lower open end of the frame over a cuspidor so that the neck thereof presses the gripping heads $G$ outward to allow the said heads to finally snap under the necks with a view to support the cuspidor. A number of cuspidors can be gathered or collected in the frame by placing the cuspidor supported in the frame on top of the next following one and then pressing the frame downward so that the first cuspidor is raised within the frame while the next cuspidor is engaged by the gripping heads $G$. When it is desired to release the cuspidors it is only necessary for the operator to take hold of both handles $C$ and $E$ and press the same toward each other, whereby the bars D are moved downward in their guideways, and in doing so the gripping devices are likewise moved downward and the bottoms G² of the gripping heads G slide over the bottoms of the grooves A⁴ thus pushing the gripping heads G inward against the tension of the springs H.

It will be noticed that by the arrangement described the gripping heads G are completely withdrawn from the neck of the lowermost cuspidor thus releasing the same and allowing the operator to lift the frame off the stack of cuspidors. If desired, the cuspidors can be quickly released one after the other by repeating the operation after a lowermost cuspidor has been discharged and the next cuspidor has been engaged by the gripping heads G.

The frame is preferably provided with a removable shell I surrounding the bars A, A', A² and A³ and their bands B, and this shell I is provided at its upper end with pins J engaging grooves B' formed in the upper ends of the bars A and A' and the uppermost ring B, as plainly indicated in Figs. 1 and 2. By the use of the shell I the collected cuspidors are hidden from view and can be readily carried to a cleaning place without offense to guests or other passers.

The cuspidor collector and carrier shown and described is very simple and durable in construction, composed of comparatively few parts and not liable easily to get out of order.

Having thus described my invention, I claim as new and desire to secure by Letters Patent:

1. A cuspidor collector and carrier, comprising a frame open at the bottom and provided with a handle at the top, said frame having longitudinally extending tubular guide-ways provided at their inner faces with openings, bars slidable in the guideways, a handle secured to the upper ends of the bars and spaced from the handle of the frame, and spring gripping members carried by the said bars and having heads normally projecting through the openings of the guideways to grip the neck of a cuspidor, the said heads having inclined lower faces in engagement with the bottoms of the said openings for forcing the heads of the gripping members outward when the bars are moved downward.

2. A cuspidor collector and carrier, comprising a frame open at the bottom and provided with a handle at the top, said frame having longitudinally extending tubular guideways provided at their inner faces with openings, bars slidable in the guideways, a handle secured to the upper ends of the bars and extending above the handle of the frame, a spring interposed between the said handles, and spring gripping members carried by the said bars and having heads normally projecting through the openings of the guideways, the said heads having inclined lower faces engaging the bottoms of the said openings for forcing them outward when the said bars are slid downward.

3. A cuspidor collector and carrier, comprising a frame formed of vertical hollow bars and bands connecting the bars, the frame being open at the bottom and provided with a handle at the upper end, two of the bars being provided with openings in their inner faces adjacent to their lower ends, bars slidable in the bars of the frame provided with the openings, spring gripping heads carried by the slidable bars and adapted to project through the openings of the bars of the frame, and a handle secured to the upper ends of the slidable bars.

4. A cuspidor collector and carrier, comprising a frame open at the bottom and provided with a handle at its upper end, the frame being provided with vertical tubular guideways having openings in their inner sides adjacent to their lower ends, bars slidable in the guideways, resilient members on the inner ends of the slidable bars and provided with heads adapted to project through the openings of the guideways, a spring secured in each guideway adjacent to the opening thereof and adapted to engage the resilient members, and a handle secured to the upper ends of the slidable bars.

In testimony whereof I have signed my name to this specification in the presence of two subscribing witnesses.

WALTER A. NIELSON.

Witnesses:
 THEO. G. HOSTER,
 PHILIP D. ROLLHAUS.

Copies of this patent may be obtained for five cents each, by addressing the "Commissioner of Patents, Washington, D. C."